W. A. BRAUN.
ELECTRICAL SAD IRON.
APPLICATION FILED FEB. 23, 1910.
974,232.
Patented Nov. 1, 1910.
2 SHEETS—SHEET 1.
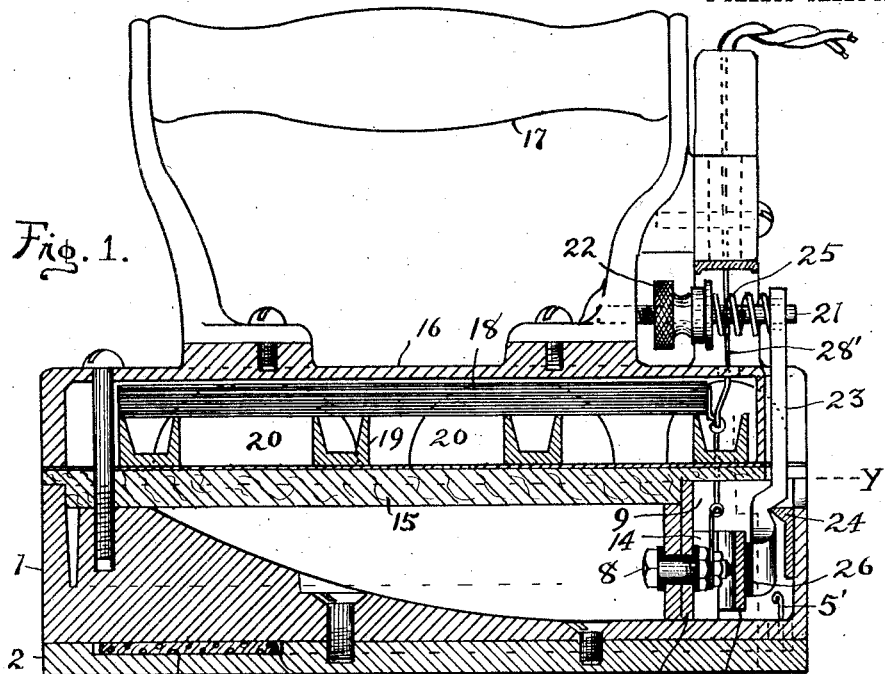
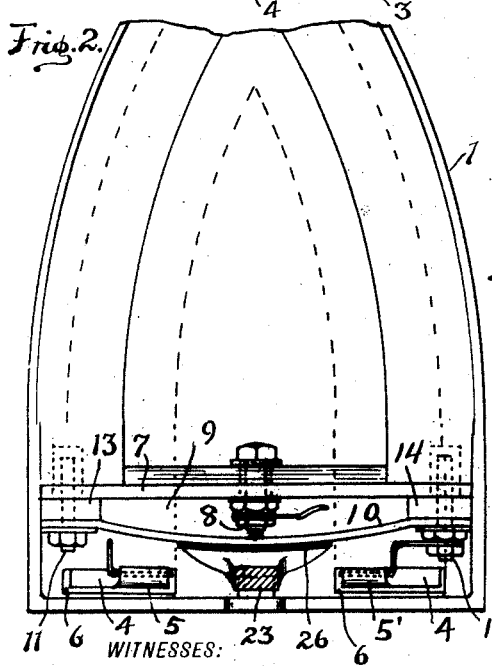
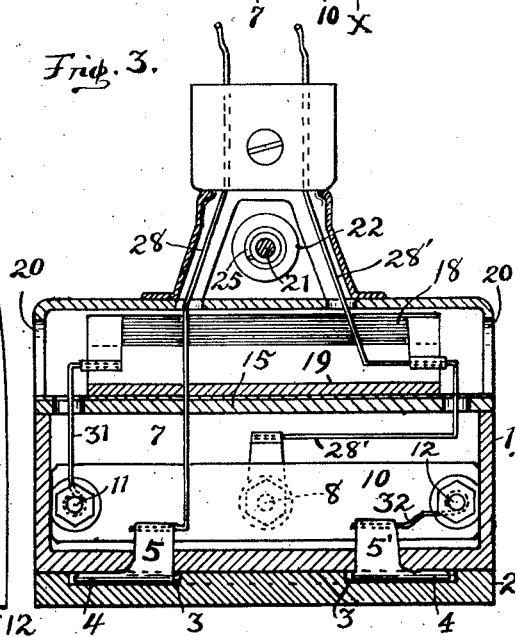
WITNESSES:
V. M. Burns.
Mathilda Mittler.
INVENTOR
William A. Braun
BY
N. G. Burns
ATTORNEY

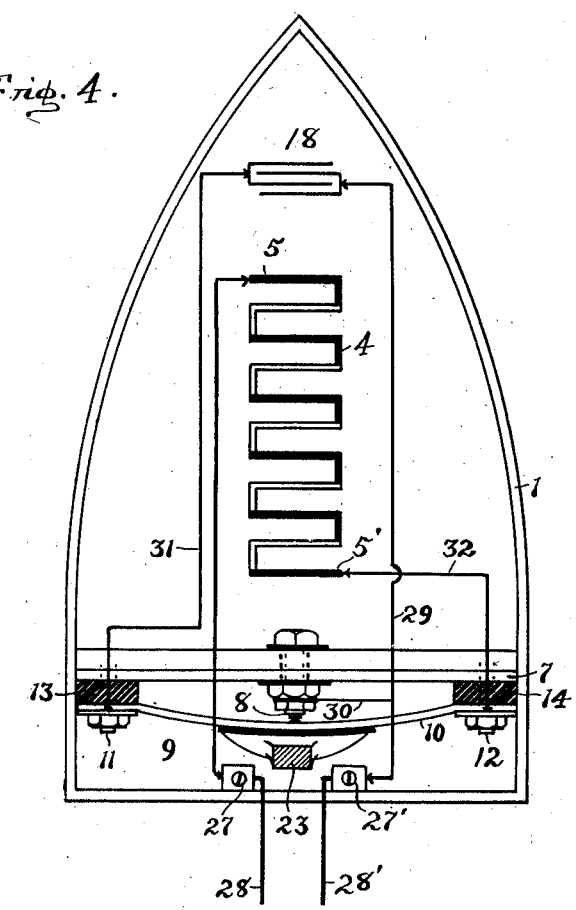

UNITED STATES PATENT OFFICE.

WILLIAM A. BRAUN, OF FORT WAYNE, INDIANA, ASSIGNOR OF ONE-HALF TO FREMONT L. JONES, OF FORT WAYNE, INDIANA.

ELECTRICAL SAD-IRON.

974,232.  Specification of Letters Patent.  Patented Nov. 1, 1910.

Application filed February 23, 1910. Serial No. 545,413.

*To all whom it may concern:*

Be it known that I, WILLIAM A. BRAUN, a citizen of the United States of America, and resident of Fort Wayne, in the county of Allen and State of Indiana, have invented certain new and useful Improvements in Electrical Sad-Irons, of which the following is a specification.

This invention relates to improvements in electrical sad irons, and the object thereof is to provide automatic means of controlling the electrical current used for heating the iron, that will be enduring and which will retain its sensitiveness in action, and which will have such construction that it may be readily adjusted to act upon reaching various desired temperatures. This object is accomplished by the construction illustrated in the accompanying drawings in which—

Figure 1. is an elevation showing the device, partially in longitudinal central section; Fig. 2. is a detail plan view showing the lower part of the device, the parts above the line Y of Fig. 1. being omitted; Fig. 3. is a transverse sectional view on the line X of Fig. 1.; and Fig. 4. is a diagram designed to show the electrical connections between the various coöperating parts of the invention.

Similar numerals of reference indicate corresponding parts throughout the several views, and referring now to the same: The base of the iron is made in two parts 1 and 2, the latter fitting flat against the bottom of the former, and having a recess 3 therein in which is contained an electrical heating element 4. The terminals 5 and 5′ of the heating element extend respectively up through openings 6 in the part 1 of the base at the rear portion thereof.

The part 1 of the base, especially the rear portion, is hollow and has an internal cross-piece 7 in which is secured an electrical contact-terminal 8. The cross-piece is so placed as to leave a chamber 9 at the rear end of the base, and within the chamber is arranged an expanding member 10 which extends transversely with its ends secured rigidly in place by bolts 11 and 12 respectively. The expanding member is insulated where secured by suitable insulators 13 and 14, is slightly arched and extends with its middle part on its concave side in contact with the adjacent end of the contact terminal when below normal working temperature and is adapted to break contact therewith when expanded by temperature above normal.

The base has an asbestos plate 15 at its top and a hollow cover 16 having a handle 17 surmounts the structure. Within the cover is an electrical condenser 18, and intervening between the plate 15 and condenser are placed a number of channel bars 19 which hold the condenser separated from contact with the plate and hinder conduction of heat from the base to the condenser. The cover has side openings 20 that afford ventilation. In this manner the condenser is prevented from becoming detrimentally heated.

An especial feature of this invention is the application of spring pressure against the expanding member toward the contact terminal 8, and while this may be accomplished with many different constructions which might be more or less simple or effective, there is here shown but one form of application: A threaded stud 21 extends from the rear part of the handle, upon which is an adjusting nut 22. A lever 23 with its upper end loosely about the outer part of the stud, rests against a fulcrum 24 within the chamber 9, and is adapted to act against the expanding member toward the contact terminal with more or less force accordingly as pressure is applied to the upper end of the lever by the spring 25 that intervenes between the adjusting nut and the end of the lever. The lever is insulated from the expanding member by a sheet of suitable material 26.

In the diagram, Fig. 4, are shown binding posts 27 and 27′, which are not included in the other figures as they may be dispensed with and the line wires connected direct instead, though for convenience in disconnecting the line wires they may be of advantage. In either event, whether the binding posts are used or not, the line wire 28 is connected with one terminal of the heating element 4, indirectly through the corresponding binding post if such are used, and directly if not. And, likewise, the other line wire 28′ has connection with the contact terminal 8 and also with one side of the condenser 18, the connecting wires in the diagram being indicated as 29 and 30, and in Fig. 3, the line wire 28′ is shown as making direct connections with the condenser and contact terminal. The opposite side of the condenser is connected with the expanding member by a wire 31, and the other terminal of the heating element is connected with the expanding member by the wire 32. With the electrical connections thus arranged, when the expanding member rests against the contact terminal, an electrical circuit is completed which follows from the line wire 28 through the heating element, and from thence through the expanding member and contact terminal to the line wire 28′, and the sides of the condenser connect on the one hand with the contact terminal and on the other with the expanding member.

When the circuit is completed, the current flows and thus energizes the heating element which in turn heats the iron, and the expanding member also becomes heated by absorption of heat from the iron, and when heated sufficiently expands and breaks its contact with the contact terminal, thus causing the current to cease. The condenser serves to prevent arcing between the contact terminal and expanding member. When the current ceases, the temperature of the iron naturally becomes reduced, and the expanding member contracts until it again makes connection with the contact terminal, aided by the constant pressure of the spring, and the current resumes.

The lever 23, in acting against the expanding member, tends to center the movements of the latter in the region of the contact terminal, besides adds sensitiveness to its action. The spring 25 being located remote from the base of the iron is not detrimentally effected by heat emanating therefrom, but exerts constant pressure against the expanding member through the medium of the lever.

Having described my invention what I claim as new and desire to secure by Letters Patent is:—

1. In apparatus of the class described, a hollow base, an electrical heating element therein; an electrical contact terminal; an expanding member in connection with the base and having normal contact with the terminal; two line-wires, said heating element expanding member, and terminal being connected in electrical series between said wires; a lever suitably fulcrumed, adapted to act against the expanding member toward the terminal; and a spring external of the base, adapted to actuate the lever.

2. In apparatus of the class described, a hollow base, an electrical heating element therein, an electrical contact terminal, an expanding member in connection with the base and normally resting in contact with the terminal, two line wires, said heating element expanding member, and terminal being connected in electrical series between said wires, and a spring pressed lever acting against the expanding member toward the terminal.

3. In apparatus of the class described, a hollow base, an electrical heating element therein, an expanding member, an electrical contact terminal, two line wires, said heating element, expanding member, and contact terminal being connected in electrical series between said wires, the expanding member normally resting in contact with the terminal and adapted to break contact therewith when expanded by heat emanating from the heating element, and means for applying spring pressure to the expanding member toward the terminal.

4. In apparatus of the class described, a hollow base, an electrical heating element therein, two line-wires, an expanding member arranged in electrical series with the heating element between said wires and being adapted to break the electrical circuit thereby formed when sufficiently expanded by heat emanating from the heating element, and means for applying spring pressure to the expanding member.

In testimony whereof I affix my signature, in presence of two witnesses.

WILLIAM A. BRAUN.

Witnesses:
 FREMONT L. JONES,
 WALTER G. BURNS.